(12) United States Patent
Andrisin et al.

(10) Patent No.: US 6,467,428 B1
(45) Date of Patent: Oct. 22, 2002

(54) FILTERED WATER AND FEEDING SYSTEM FOR PETS

(75) Inventors: John Andrisin, Cleveland, OH (US); William E. Bartasevich, Kent, OH (US)

(73) Assignee: Ourpet's Company, Fairport Harbor, OH (US)

(*) Notice: Subject to any disclaimer, the term of this patent is extended or adjusted under 35 U.S.C. 154(b) by 0 days.

(21) Appl. No.: 09/821,906

(22) Filed: Mar. 30, 2001

Related U.S. Application Data

(60) Provisional application No. 60/193,777, filed on Mar. 31, 2000.

(51) Int. Cl.$^7$ .............................. A01K 5/00; A01K 7/00
(52) U.S. Cl. ........................................ 119/51.5; 119/77
(58) Field of Search ............................... 119/51.5, 74, 77

(56) References Cited

U.S. PATENT DOCUMENTS

| | | | |
|---|---|---|---|
| 854,615 A | * 5/1907 | Vorheis et al. ............... | 119/77 |
| 867,621 A | * 10/1907 | Tannehill ..................... | 119/77 |
| 3,112,733 A | 12/1963 | Arnott | |
| 3,720,184 A | 3/1973 | Pearce ......................... | 119/51.5 |
| 3,730,141 A | 5/1973 | Manning et al. ............ | 119/51.5 |
| 4,034,715 A | 7/1977 | Arner .......................... | 119/51.5 |
| 4,134,365 A | 1/1979 | Futers et al. ............... | 119/51.5 |
| 4,573,434 A | * 3/1986 | Gardner ....................... | 119/77 |
| 4,721,063 A | 1/1988 | Atchley ..................... | 119/61 X |
| 4,840,143 A | * 6/1989 | Simon ........................ | 119/52.1 |
| 5,609,759 A | 3/1997 | Nohren, Jr. et al. ........ | 210/266 |
| 5,687,783 A | 11/1997 | Finnegan ................... | 119/77 X |
| 5,799,609 A | 9/1998 | Burns et al. ................. | 119/74 |

* cited by examiner

Primary Examiner—Robert P. Swiatek
(74) Attorney, Agent, or Firm—John D. Gugliotta

(57) ABSTRACT

A filtered water system for pets that includes two (2) gravity feed units, one (1) of which dispenses filtered water and the other which dispenses dry pet food. The filtered water gravity feed unit includes a breather tube such that when the water level drops below the breather tube level in the water bowl, air enters into the breather tube equalizing the pressure inside and outside of the water bottle. This allows water to fill the water bowl to a level where the pressure inside the water bottle is equal to or less than the pressure on the water in the water bowl and water stops flowing. The water gravity feed unit includes a filter capable of removing some contaminants from the water.

15 Claims, 7 Drawing Sheets

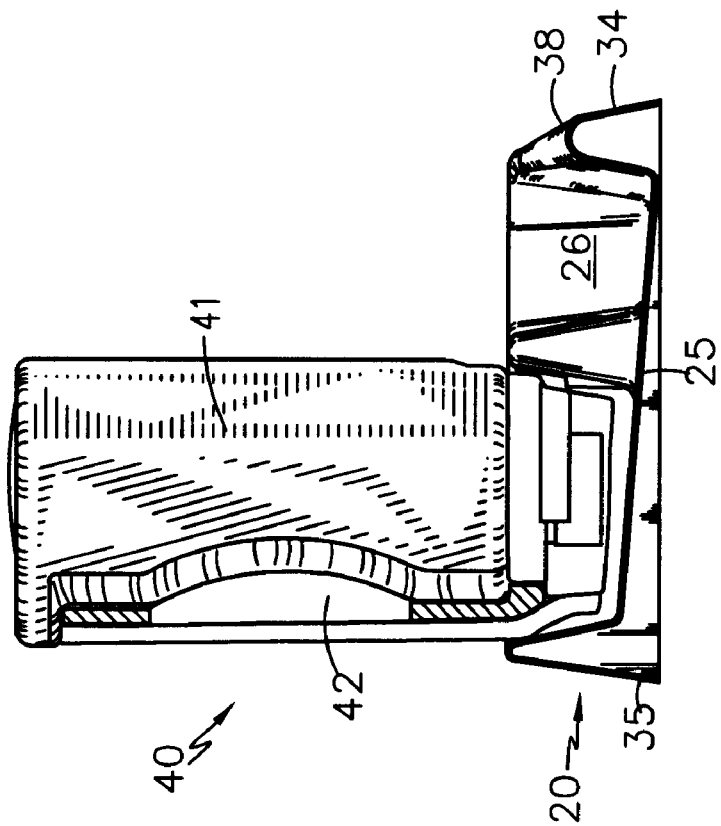
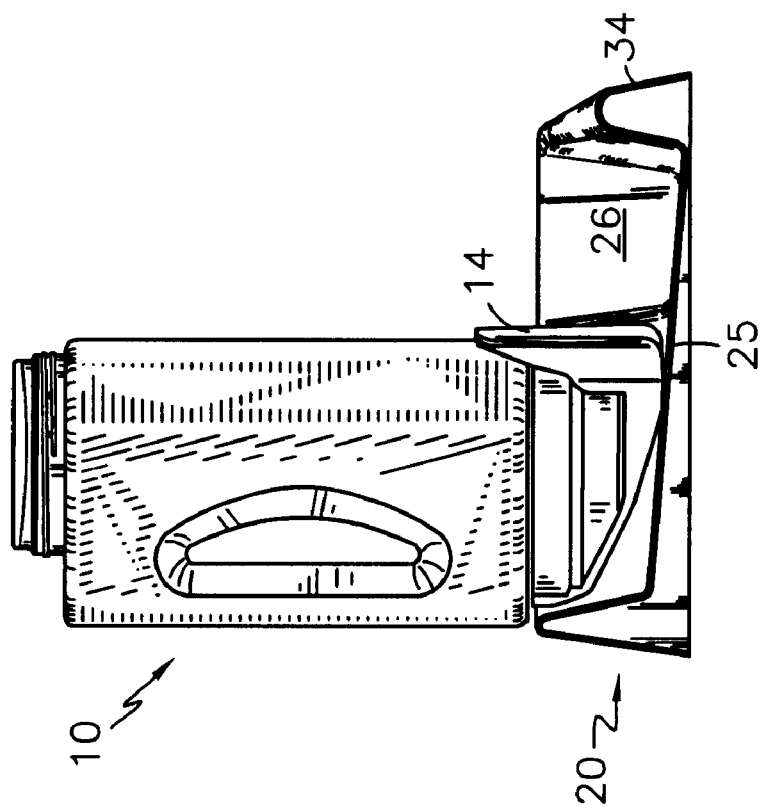

FILTERED WATER AND FEEDING SYSTEM FOR PETS

RELATED APPLICATIONS

The present invention was first described in and is a continuation of U.S. Provisional Patent No. 60/193,777 filed Mar. 31, 2000, and now abandoned.

BACKGROUND

Dishes for feeding animals, such as pets, typically need to be filled by the animals human caretaker on a regular basis. Often, human activities interfere with this regular feeding schedule. Animal caretakers may have to be away from the animal at a normally scheduled feeding time or be away for a period of days.

Due to the busy schedules of some animal owners, provisions must be made for feeding the animals when the owner or caretaker cannot. There is therefore perceived a need for a means for automatically refilling the food and/or water dishes of animals, such as household pets.

In addition, contaminants in tap water such as chlorine, lead or other chemical contaminants may be harmful to animals when ingested. Thus, it is beneficial to filter out some of these chemicals or other contaminants that may be harmful to an animal. A water filtration system could be especially beneficial to household pets such as dogs and cats. Cats have evolved by eating smaller animals such as mice. The livers of these animals are capable of eliminating toxic materials. However, the livers of dogs and cats have not evolved to handle the levels of toxic materials that can be found in some processed food and tap water.

SUMMARY

The present invention relates generally to new and novel improvements in a filtered water system for pets. More particularly, the present invention relates to a filtered water system for pets that includes two (2) gravity feeding units, one (1) of which dispenses filtered water and the other of which dispenses dry pet food.

Accordingly, an object of the present invention is the provision of a filtered water system for pets which provides filtered water and dry pet food for the pets.

These and other objects of the present invention are attained by a filtered water system for pets that includes two (2) gravity feed units, one (1) of which dispenses filtered water and the other of which dispenses dry pet food. The filtered water gravity feed unit includes a breather tube such that when the water level drops below the breather tube level in the water bowl, air enters into the breather tube equalizing the pressure inside and outside of the water bottle. This allows water to fill the water bowl to a level where the pressure inside the water bottle is equal to or less than the pressure on the water in the water bowl and water stops flowing. The filter may be an activated carbon filter capable of removing chlorine, lead or other heavy metals. In addition, depending on the geographical water conditions, an iodine or similar filter could be used to remove bacteria from the water.

Other advantages and novel features of the present invention will become apparent in the following detailed description of the invention when considered in conjunction with the accompanying drawing.

BRIEF DESCRIPTION OF THE DRAWINGS

FIG. 10 is a side view of a food bottle and bowl assembly showing a side cross section of the bowl in accordance with the present invention.

FIG. 11 is a side view of a filtered water bottle and bowl assembly showing a side cross section of the bowl in accordance with the present invention.

DETAILED DESCRIPTION OF THE DRAWINGS

In the following detailed description of a preferred embodiment of the present invention, reference is made to the accompanying drawings which, in conjunction with this detailed description, illustrate and describe a preferred embodiment of a filtered water system for pets in accordance with the present invention.

Figure 1:
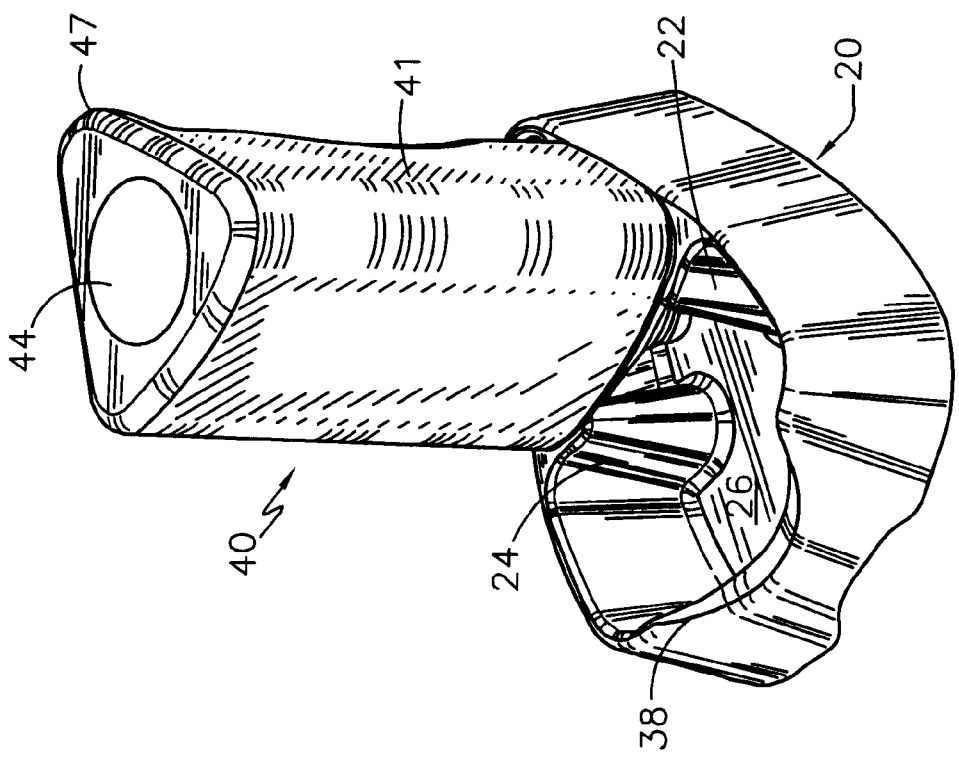
FIG. 1 is an isometric view of a pet food unit in accordance with the present invention.
Figure 2:
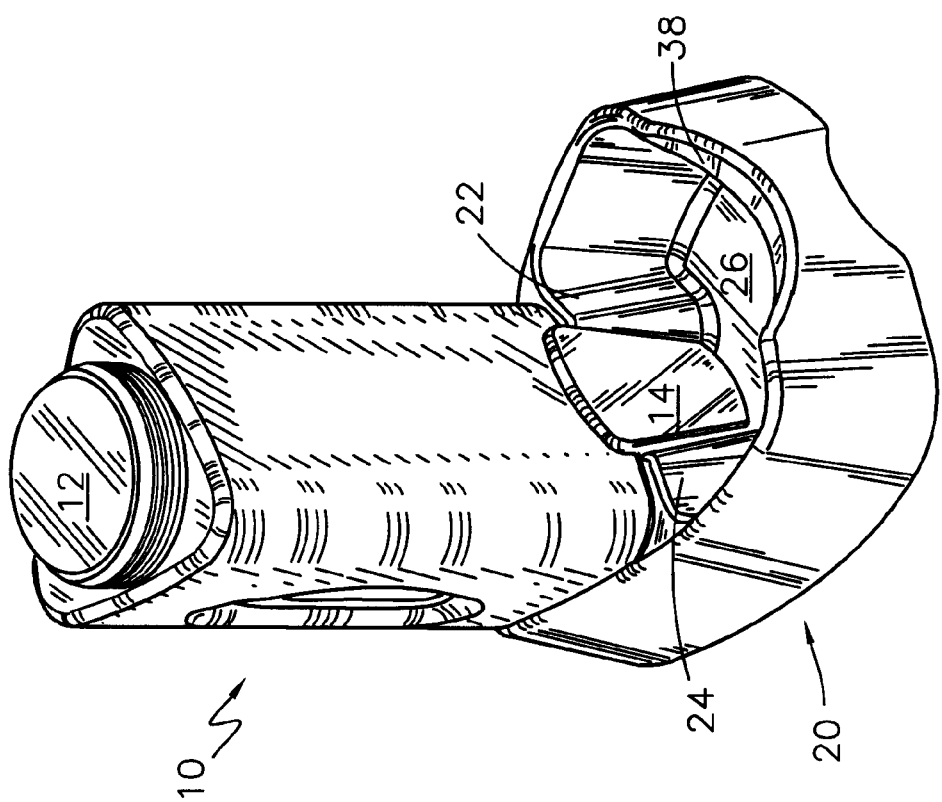
FIG. 2 is an isometric view of a filtered water unit in accordance with the present invention.

FIG. 1 illustrates a pet food bottle 10 and bowl 20 assembly and FIG. 2 illustrates a filtered water bottle 40 and bowl 20 assembly in accordance with the present invention. In a preferred embodiment, the same bowl 20 is preferably made of sturdy/durable plastic or another suitable polymer material. The material of which the water bottle, pet food bottle and bowl are fabricated is preferably strong enough to substantially resist breaking or deforming from forces which may be applied by the pet or animal being fed. Other materials such as stainless steel may also be used.

As shown in FIGS. 1–4, 10–11. the bowl 20 has a four wall structure having a front wall 34 a rear wall 35 and two side walls 37, 39. The four walls are connected by a floor portion 25. The bowl 20 has a food or water receptacle portion 26 and a portion 28 for holding a bottle, The bowl 20 has inwardly extending panels 22 and 24 to create a space 28 for a bottle 10 or 40 to be held in an upright position. Panels 22 and 24 extend inwardly from the side walls of the bowl, preferably leaving an opening 23. This opening 23, in a preferred embodiment, is substantially tie same size as opening 14 in the pet food bottle as seen in FIG. 1. This allows food to flow from the bottle 10 into food reservoir portion 26 substantially unobstructed by panels 22 and 24. Bowl 20 further comprises slots 33, 32 located in each side wall of bottle holding position of the bowl for facilitating holding bottle 10 or 40 in an upright position. Slots 30, 32 may engage projections 18 located on the lower portion of the outer wall of the bottle 10 or 40 when bottle is inserted into the bottle holding portion 28 of bowl 20. The bottle holding portion 28 of the bowl 20 is shaped to have an opening that substantially matches the shape of the bottle to be inserted therein. Thus, although tie bottles and bowls illustrated in the drawings herein show cylindrical or triangular shapes, other shapes are clearly within the scope of the present invention.

Figure 3:
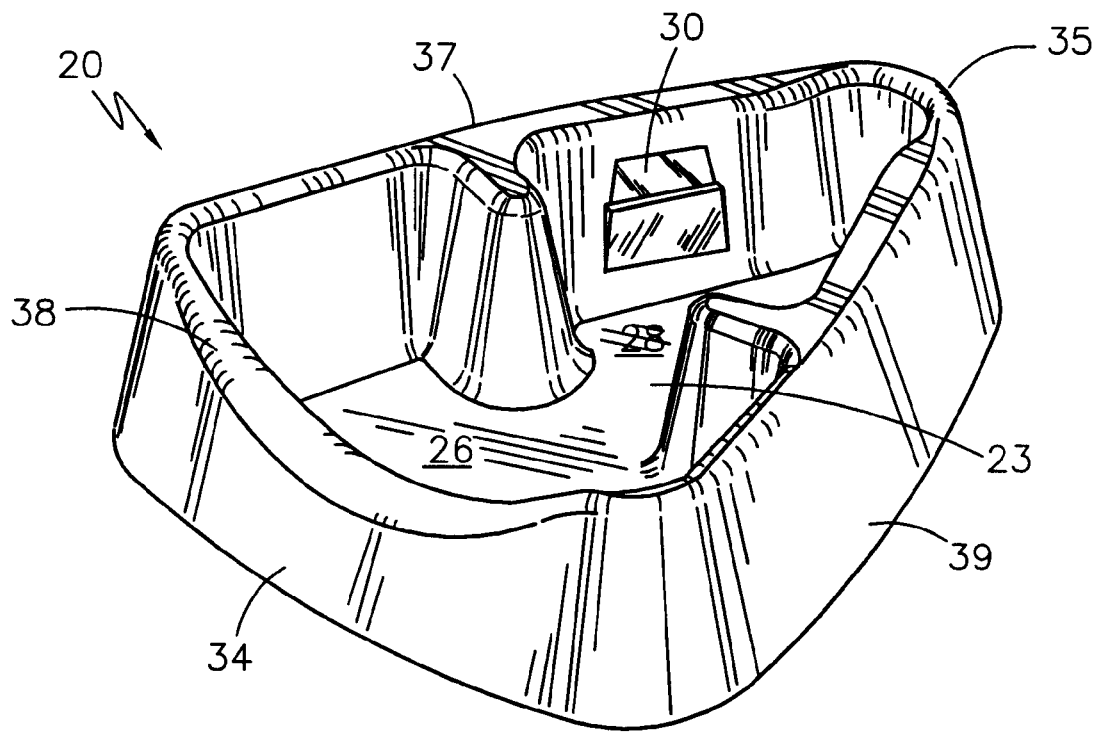
FIG. 3 is a prospective view of a plastic bowl used in the pet food and filtered water units shown in FIGS. 1 and 2 in accordance with the present invention.

In a preferred embodiment, front wall 34 of bowl 20 has a concave curvature 38 therein as shown in FIG. 3. Such a curvature 38 allows an animal, such as a dog or cat, to easily reach their mouth into the bowl to obtain the food or water.

Figure 4:
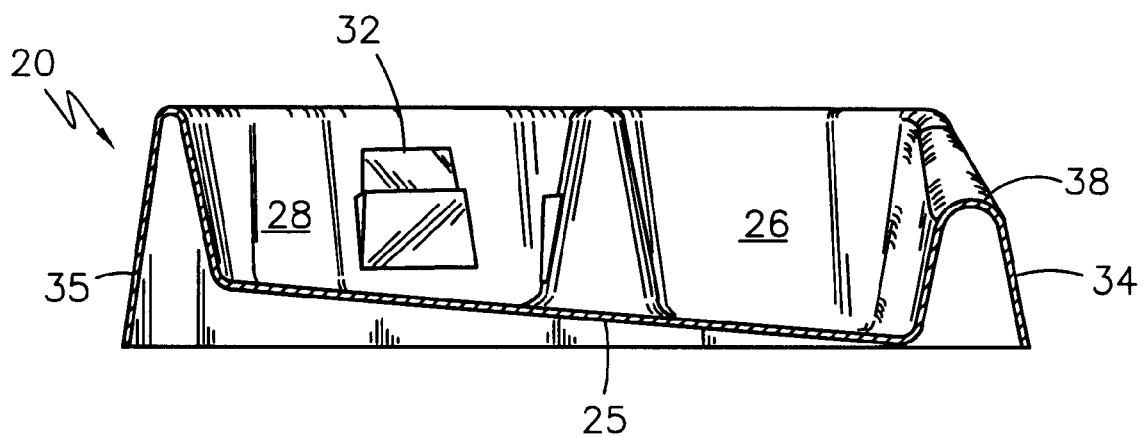
FIG. 4 is a cross-sectional view of a plastic bowl in accordance with the present invention.
Figure 5:
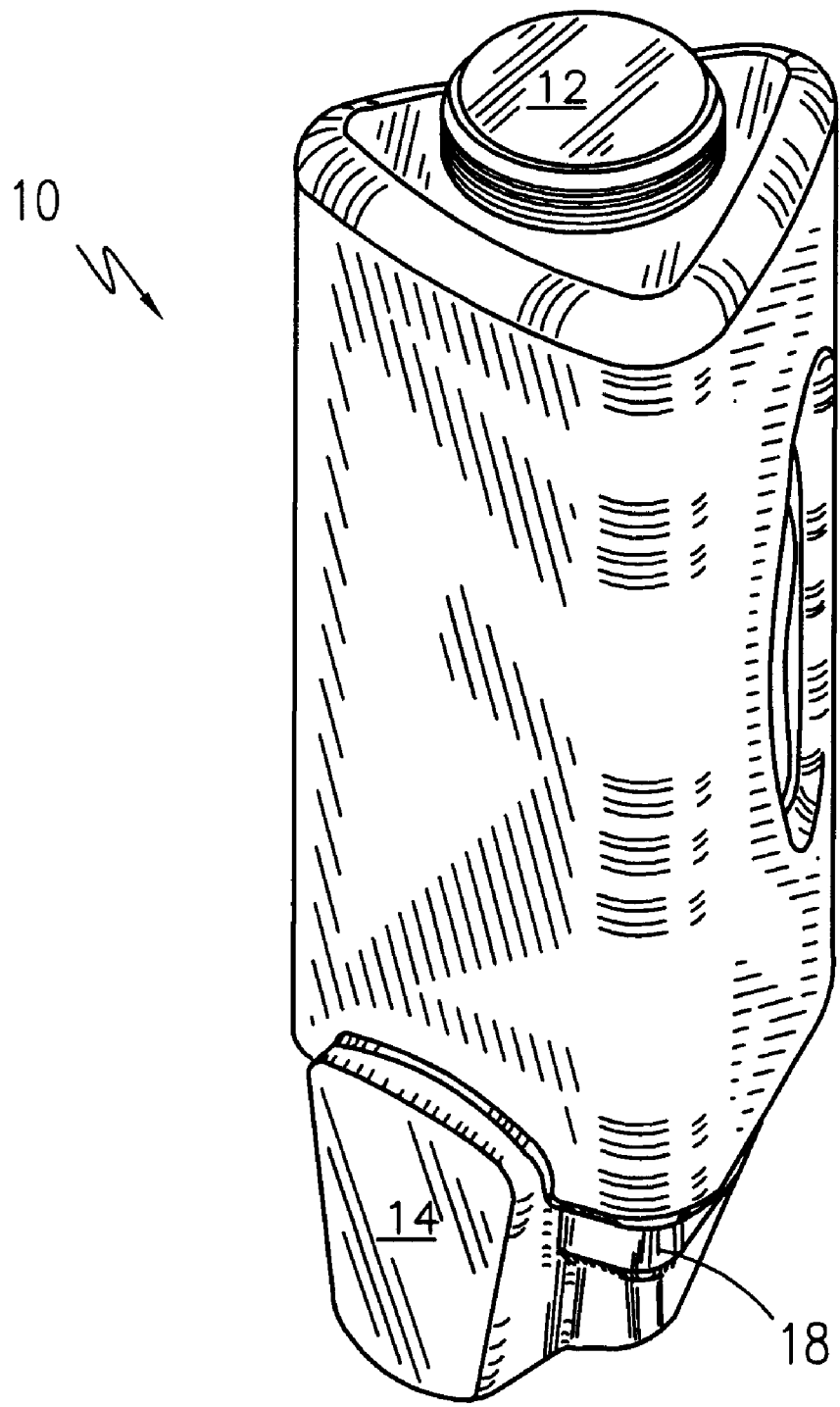
FIG. 5 is an isometric view of the pet food bottle in accordance with the present invention.
Figure 6:
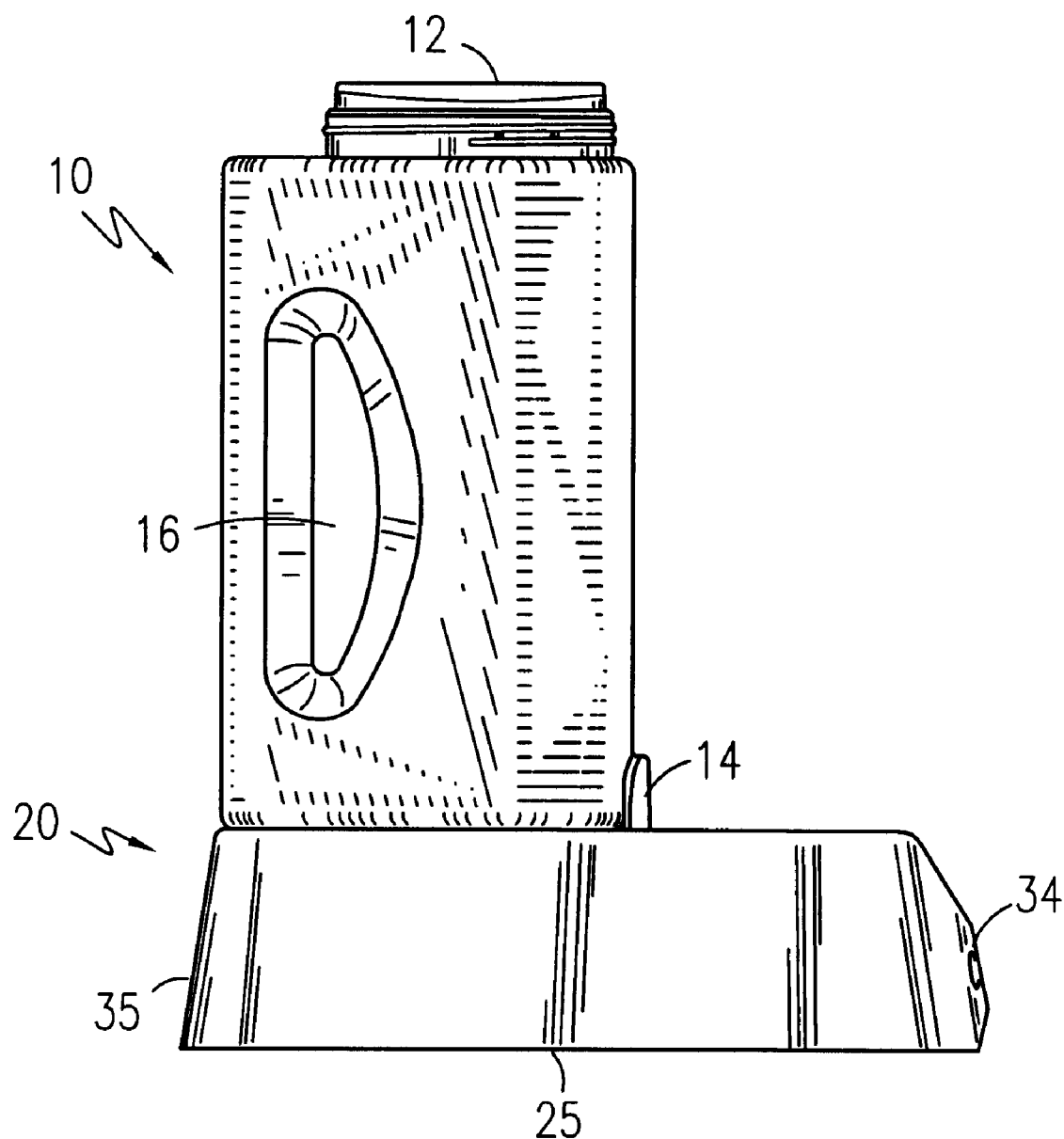
FIG. 6 is a side view of the pet food bottle in accordance with the present invention.
Figure 7:
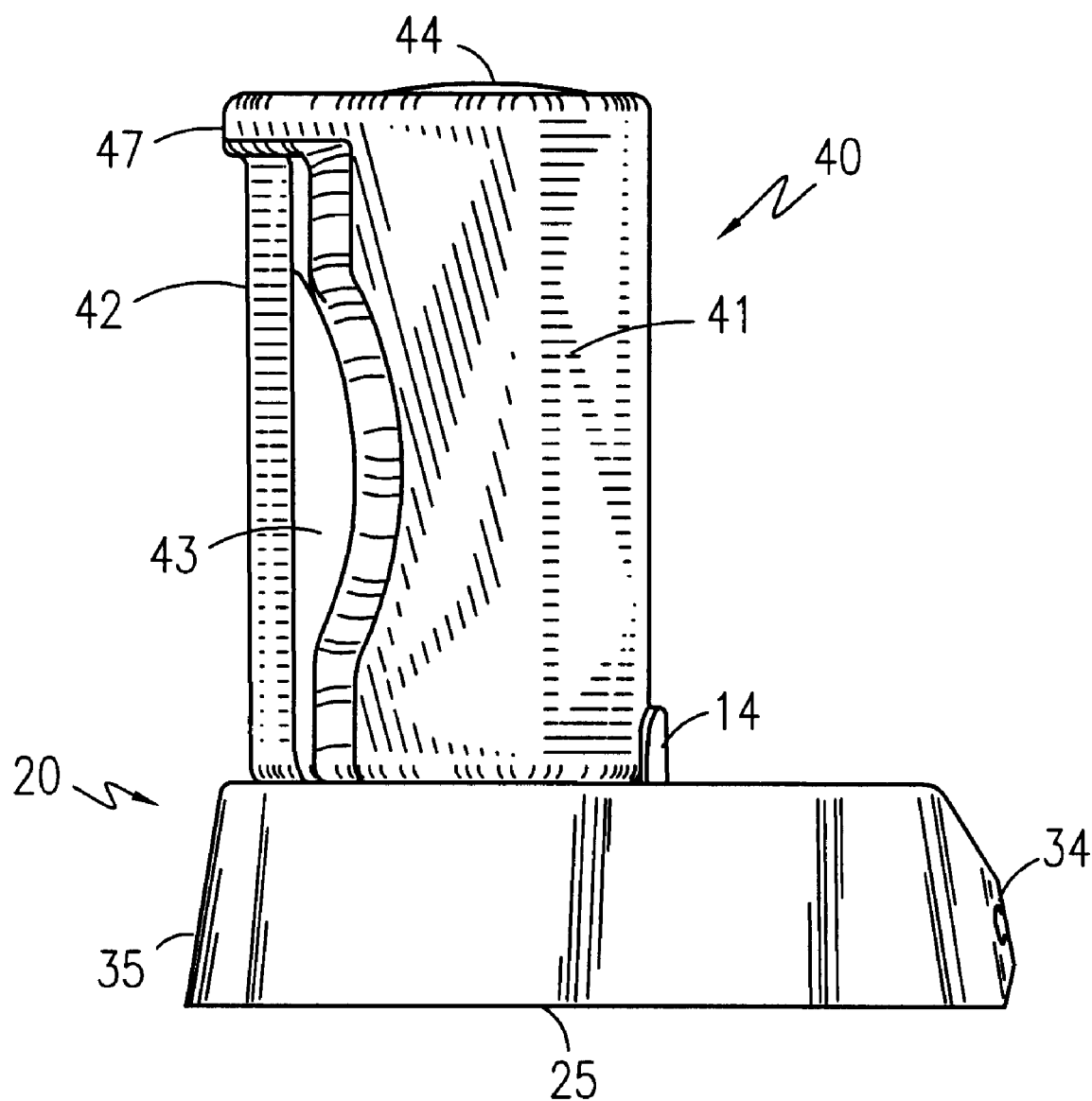
FIG. 7 is a side view of the filtered water bottle in accordance with the present invention.

As shown in FIG. 4, the floor or bottom surface 25 of bowl 20 preferably has a downward slope from the rear wall 35 of bowl 20 to the end of the food or water reservoir 26 to the front wall 34. This downward slope will facilitate food flowing out of the bottle and into the food or water reservoir 26 portion of the bowl.

FIGS. 1, 5, 6 and 10 illustrate a pet food bottle and bowl which make up the pet food unit of the present invention. The bottle, generally designated 10, in accordance with the present invention, is preferably fabricated of plastic or other polymeric material, although it is contemplated that other materials could be used. The pet food bottle 10 is a substantially cylindrical or triangular shape. The pet food bottle 10 has an opening 12 in the top thereof for filling the pet food unit with pet food. The food used in conjunction with the present invention is preferably a dry pet food to substantially avoid any food sticking to the inner surface of bottle 10 or opening 14. However, other types of food are clearly within the scope of the invention. The top opening 12 may have grooves formed therein for engaging complementary grooves in a cap to cover the pet food bottle of the present invention. The pet food bottle of the present invention may alternatively have a snap on cap or another type of removable cover for the top of the pet food bottle 10, although no cover may optionally be used. The pet food bottle 10 also has an opening 14 in the bottom portion through which the pet food flows into a feeding bowl. In addition, in a preferred embodiment of the present invention, the openings 12 and 14 in the pet food bottle are substantially free of sharp edges which may be dangerous to an animal or a person handling the bottle. The bottom opening 14 in the pet food bottle 10 also preferably has clean edges, which are substantially free of burrs or other irregularities which might obstruct the flow of food pieces through the opening 14 or might break off and mix in with the pet food causing a choking or other hazard to the animal.

FIGS. 2, 7–9 and 11 illustrate a water bottle 40 of the present invention. The water bottle 40 generally designated 40, preferably has a cylindrical or triangular shape, similar to the pet food bottle 10 and is constructed of plastic or other similarly durable material. The water bottle 40 has a water vessel 41, which holds the supply of water for the animal in the present invention. The water bottle 40 has an opening or mouth 50 in a bottom end 51 to which is attached a cap 52 which has a filter inserted therein. The cap and filter assembly will be described below in reference to FIGS. 8 and 9. The water bottle 40 has a top end 44 opposite the bottom end 50. The top end portion 44 of the water bottle preferably extends at least a short distance above the water level in the water vessel. The top end portion also extends beyond the dimensions of the water vessel portion at one end 47. A breather tube 42 is connected to end 47 of the top of the water bottle. The top of water bottle 44 and breather tube are all connected to water bottle such that substantially no air will enter water bottle, except through breather tube 42. It is contemplated by the present invention that breather tube may be connected to the top portion of the water bottle or proximate to the top portion of the water bottle in other manners that those shown. The only requirement is that breather tube be connected proximate to the end of water bottle opposite the mouth in such a way as to substantially prevent air from entering the water bottle through the top portion except through the other end of breather tube.

Breather tube 42 extends along the length of water bottle 40 along its back edge. The back edge, in this case, is the edge positioned at the rear wall 35 of bowl 20 that is away from where the animal will drink from the bowl at the front wall 34. Breather tube 42 is preferably constructed of plastic. Breather tube 42 is connected at a first end to the end 47 of top 44 portion of the water bottle. The breather tube 42 extends from the top 44 of the bottle 40 at least slightly farther than the cap 52 at the bottom end of water bottle 40. This is to allow the second end of breather tube 42 to extend a short distance into the water when it is in the bowl 20. In one embodiment, the breather tube 42 is open at the end which goes into the bowl. In another embodiment, the breather tube 42 is closed at the second end and a slit or opening is made in a lower portion of the breather tube which extends into bowl 20. The slit or opening is made in a portion of the breather tube which extends below the cap 52 at the bottom of water bottle, so that the slit will be underwater when the water bowl is filled with water.

Breather tube 42 may be additionally secured into position on said water bottle 40 by a web of material 43. However, such a web is optional. The breather tube may be secured into place by connecting a first end to the top of the water bottle and placing the second end into bowl.

Figure 9:
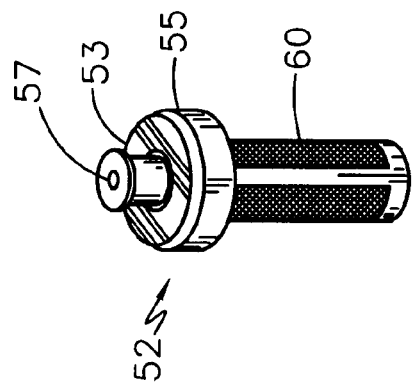
FIG. 9 illustrates a cap and filter assembly to be used with the water bottle in accordance with the present invention.
Figure 8:
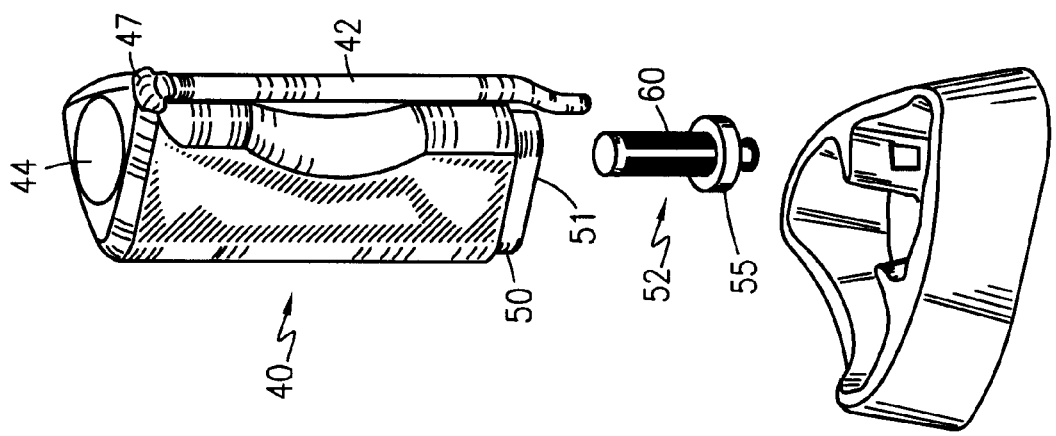
FIG. 8 is an exploded view of the water bottle, cap, filter and bowl in accordance with the present invention.

The cap 55 and filter 60 assembly for water bottle are generally designated 52 and is illustrated in FIGS. 8 and 9. The mouth 50 of water bottle preferably has grooves therein which are complementary to grooves on cap 55 so that cap 55 can be screwed onto mouth 50 of bottle 40. Cap 55 has a filter 60 secured thereto such that filter will be inserted into the mouth of the water bottle when cap 55 is positioned on the mouth 51 of water bottle 40. The filter 60 is preferably capable of removing contaminants from water as water flows though the filter on its way out of the mouth of the water bottle. The filter may be an activated carbon filter for removing chemical contaminants. It is also envisioned that another type of filter could be used such as an iodine filter. The iodine filter would be useful for killing bacteria. These filters and other types of filters could be modified based on water conditions in different geographic locations.

The cap further comprises an outlet portion 53 having an opening 57 therein. The outlet 53 is preferably in the form of a push-pull cap. These types of caps are well known. The basic operation of the cap is as follows. To open the push-pull cap, it is pulled away from the base portion such that air can enter through cap portion. The push-pull cap contains a projection therein which will hinder the flow of water through the cap when the cap is in its open position. Some air must enter the bottle and exert some pressure to force liquid out of the bottle. When the cap is in the closed position, the outer portion of the cap is flush with the base portion and is closed around the projection such that substantially no air can enter bottle through the cap.

The water bottle functions as follows. The cap/filter assembly 52 is removed from mouth 50 of water bottle, and bottle is filled with water. Alternatively, water bottles could be disposable. In that case the animal caretaker could have a supply of water bottles. The animal caretaker would secure the cap/filter assembly 52 to the mouth of the filled water bottle. The outlet portion of the cap would be pulled to the open position. The water bottle is then positioned into bowl 20. The bottom portion of the water bottle 40 is secured into place in bowl 20 by engagement of the projections 18 in bottle 40 with slots 30 and 32 formed into the inner portions of the side walls of bowl 20. The bottle is further held into an upright position by means of the panels 22, 24 extending inwardly from the side walls of bowl 20. The water bottle is positioned such that breather tube 42 is away from the water retaining portion 26 of bowl. The second end of breather tube 42 extends into bottle holding portion 26 of bowl 20. When the bowl is empty, the air is able to enter the end of breather tube or the slit in breather tube. As the air enters, the air pressure in water bottle increases. Water will flow out of water bottle and into bowl until the water in the bowl is at a level to cover the opening in the breather tube 42. At this point, air can no longer enter the breather tube. Water will continue to flow out of bottle until the pressure in the bottle is equal to or less than the pressure on the water in the bowl.

As an animal drinks water from bowl, the water level decreases. When the water level is below the breather tube opening, air will again enter the tube and create additional air pressure within water bottle. Water will again flow out of water bottle until the pressure is substantially equalized.

In use, the pet food bottle 10 is placed into the bottle retaining portion 28 of bowl 20. The bottom portion of the pet food bottle 10 is secured into place in bowl 20 by engagement of projections in bottle 18 with slots 30, 32 formed into the inner portions of the side walls of bowl 20. The bottle 10 is further held into an upright position by means of the panels 22, 24 extending inwardly from the inner walls of bowl 20. Once bottle is positioned, it is filled with pet food. Pet food will first go into bottle and through the bottom opening 14 in bottle 10. Once the food receiving portion 26 of bowl has been filled with food, the food which has accumulated in the bowl will obstruct the bottom opening 14 in bottle. Thus, food will begin to accumulate in pet food bottle 10. The bottle may be partially or completely filled, depending on the amount of food a particular animal is expected to eat in a particular amount of time. Alternatively, the pet food bottle 10 may be filled with pet food prior to inserting it into the pet food bowl 20. In this situation, a user would want to hold bottle 10 and dish 20 in a sideways position so as to avoid spilling food through openings 12 or 14.

As an animal eats food from the bowl, the obstruction in front of the bottom opening 14 of bottle will be relieved. Due to the force of gravity on the food in bottle 10, food will flow downwardly out of bottle 10, through the bottom opening 14 and into the food receiving portion 26 of bowl 20. The process will continue as the animal eats more food from bowl 20 until food bottle 10 is substantially empty.

In one embodiment of the present invention, pet food bottle 10 or water bottle 40 may optionally have depressions 16 formed into a portion of the side walls of the bottle. Such depressions may be useful for gripping the bottle when it is removed from or inserted into the bowl 20.

Several orientations of the bottle-bowl assemblies are contemplated by the present invention. In one embodiment, the same bowl may be used both with the water bottle and the food bottle. Preferably, however, an animal caretaker would have two bowls, one for food and one for water such that both are available to the animal at the same time. The pet food bottle-bowl assembly and the water bottle-bowl assembly may be connected. For instance, two bowls may be held together by means of an adhesive, a clip or an elastic band, or some other mechanical means. The bowls may be held together in a side by side configuration such that the food and water holding portions of the bowls face in the same direction and are next to each other. In another embodiment, the bowls/bottles may be held together in a back to back configuration, The food and water holding portions of the bowls could be orientated to face each other or to be opposite each other.

Although the present invention has been described above in detail, the same is by way of illustration and example only and is not to be taken as a limitation on the present invention. For example, further features and advantages of the filtered water system for pets in accordance with a preferred embodiment of the present invention are shown and described in the drawings. In addition, the filtered water system for pets in accordance with the present invention could be modified in various ways. Accordingly, the scope and content of the present invention are to be defined only by the terms of the appended claims.

What is claimed is:

1. An apparatus for providing water to an animal, said apparatus comprising:
   a bottle, wherein said bottle comprises,
   a first end and a second end;
   a water vessel;
   wherein said first end comprises a mouth therein for releasing water from said water vessel;
   a breather tube, having a first end and a second end;
   wherein said breather tube comprises an opening proximate to said second end of said breather tube;
   wherein said first end of said breather tube is open and is connected to said second end of said water bottle such that said water bottle is substantially closed to air entering said second end of said water bottle except through said opening proximate to said second end of said breather tube;
   a bowl;
   wherein said bowl comprises a front wall, a rear wall, two side walls, and a floor connecting said front wall, said rear wall and said two side walls;
   wherein said bowl further comprises two panels each extending inwardly from each of said two side walls of said bowl to divide said bowl into a bottle holding portion and a water reservoir;
   wherein said floor slopes downwardly from said bottle holding portion to said water reservoir;
   wherein said bottle is removably secured in said bottle holding portion of said bowl such that said mouth of said bottle and said second end of said breather tube extend into said bottle holding portion of said bowl; and
   wherein said bottle is held in an upright position between said rear wall of said bowl and said inwardly extending panels.

2. The apparatus as recited in claim 1 further comprising:
   a cap having an opening therein positioned on said mouth of said water bottle; and
   a filter secured to said cap, wherein said filter is oriented in said cap such that said filter extends into said mouth of said water bottle.

3. The apparatus as recited in claim 2 wherein said filter is an activated carbon filter.

4. The apparatus as recited in claim 2 wherein said filter is an iodine filter.

5. The apparatus as recited in claim 1, wherein said side walls of said bowl further comprise slots in said bottle holding portion of said bowl.

6. The apparatus as recited in claim 5, wherein said bottle contains projections proximate to said first end of said bottle, wherein said projections are adapted to engage said slots in said bottle holding portion of said bowl.

7. The apparatus as recited in claim 1 wherein said opening in said breather tube comprises a silt in said breather tube.

8. An apparatus for providing food and water to animals, said apparatus comprising:

a bottle, wherein said bottle comprises, a first end and a second end;

a water vessel;

wherein said first end comprises a mouth therein for releasing water from said water vessel;

a breather tube, having a first end and a second end;

wherein said breather tube comprises an opening proximate to said second end of said breather tube:

wherein said first end of said breather tube is open and is connected to said second end of said water bottle such that said water bottle is substantially closed to air entering said second end of said water bottle except through said opening proximate to said second and of said breather tube, a first bowl;

wherein said first bowl comprises a from wall, a rear wall, two side walls, and a floor connecting said front wall, said rear wall and said two side walls;

wherein said first bowl further comprises two panels each extending inwardly from each of said two side walls of said first bowl to divide said bowl into a bottle holding portion and a water reservoir;

wherein said water bottle is removably secured in said bottle holding portion of said bowl such that said mouth of said water bottle and said second end of said breather tube extend into said bottle holding portion of said first bowl;

wherein said water bottle is held in an upright position between said rear wall of said first bowl and said inwardly extending panels;

a food bottle, wherein said food bottle comprises, a first closed end;

an opening in a side surface of said food bottle for food to flow out of said food bottle, said opening proximate to said first closed end of said food bottle, and a second end having an opening therein for introducing food to said food bottle, a second bowl, wherein said second bowl comprises, a front wall, a rear wall, and two side walls, a floor connecting said front wall, said rear wall and said two side walls;

two panels each extending inwardly from each of said two side walls of said second bowl to divide said second bowl into a bottle holding portion and a food reservoir;

wherein said panels extend a distance into said bowl leaving a gap substantially the same size as said opening in said surface of said food bottle;

wherein said food bottle is inserted in said second bowl such that said opening in said side surface of said food bottle is aligned with said gap; and wherein said floor slopes downwardly from said bottle holding portion to said water reservoir.

9. The apparatus as recited in claim 1 further comprising:

A cap having an opening therein positioned on said mouth of said water bottle; and a filter secured to said cap, wherein filter is oriented in said cap such that said filter extends into said mouth of said water bottle.

10. The apparatus as recited in claim 9 wherein said filter is an activated carbon filter.

11. The apparatus as recited in claim 9 wherein said filter is an iodine filter.

12. The apparatus as recited in claim 8 wherein said side walls of said first bowl filter comprise slots in said bottle holding portion of said bowl.

13. The apparatus as recited in claim 12 wherein said water bottle contains projections proximate to said first end of said bottle, wherein said projections are adapted to engage said slots in said bottle holding portion of said first bowl.

14. The apparatus as recited in claim 8 wherein said side walls of said second bowl further comprise slots in said bottle holding portion of said bowl.

15. The apparatus as recited in claim 14 wherein said food bottle contains projections proximate to said first end of said food bottle, wherein said projections are adapted to engage said slots in said bottle holding portion of said second bowl.

* * * * *